United States Patent
Abe

(10) Patent No.: US 12,463,264 B2
(45) Date of Patent: Nov. 4, 2025

(54) METHOD FOR OPERATING STORAGE BATTERY SYSTEM

(71) Applicant: NGK Insulators, Ltd., Nagoya (JP)

(72) Inventor: Hiroyuki Abe, Anjo (JP)

(73) Assignee: NGK INSULATORS, LTD., Nagoya (JP)

( * ) Notice: Subject to any disclaimer, the term of this patent is extended or adjusted under 35 U.S.C. 154(b) by 746 days.

(21) Appl. No.: 17/817,080

(22) Filed: Aug. 3, 2022

(65) Prior Publication Data

US 2022/0376318 A1   Nov. 24, 2022

Related U.S. Application Data

(63) Continuation of application No. PCT/JP2020/038265, filed on Oct. 9, 2020.

(30) Foreign Application Priority Data

Mar. 18, 2020   (JP) .................................. 2020-047296

(51) Int. Cl.
*H01M 10/44* (2006.01)
*G01R 31/392* (2019.01)
(Continued)

(52) U.S. Cl.
CPC ........ *H01M 10/441* (2013.01); *G01R 31/392* (2019.01); *H01M 10/60* (2015.04); *H01M 2010/4271* (2013.01); *H02J 7/0069* (2020.01)

(58) Field of Classification Search
None
See application file for complete search history.

(56) References Cited

U.S. PATENT DOCUMENTS 5,917,751 A * 6/1999 Wakita ............... G11C 16/3404
365/185.11
6,366,056 B1 * 4/2002 Podrazhansky ....... H01M 10/44
320/141
(Continued)

FOREIGN PATENT DOCUMENTS

EP   1 837 944 A2   9/2007
EP   3 007 310 A2   4/2016
(Continued)

OTHER PUBLICATIONS

English translation of the International Preliminary Report on Patentability (Chapter I) dated Sep. 29, 2022 (Application No. PCT/JP2020/038265).
(Continued)

*Primary Examiner* — Imran Akram
(74) *Attorney, Agent, or Firm* — BURR PATENT LAW, PLLC

(57) ABSTRACT

A plurality of storage batteries are divided into a plurality of storage battery blocks. A useful life of each of the storage batteries is shorter than the project life. Total capacity of the plurality of storage batteries is equal to or greater than the product of capacity required for a project and a ratio of the project life to the useful life. The project life is divided into a plurality of periods. For each of the plurality of periods, a rest storage battery block is selected from the plurality of storage battery blocks in rotation, the rest storage battery block is rested, and an operational storage battery block is operated. The sum of actual operating time of each of the storage battery blocks and equivalent operating time of each of the storage battery blocks is prevented from exceeding the useful life during the project life.

15 Claims, 4 Drawing Sheets

|  | CALENDAR YEAR 171 | | | | |
|---|---|---|---|---|---|
|  | 172a,172 YEAR 1-5 | 172b,172 YEAR 6-10 | 172c,172 YEAR 11-15 | 172d,172 YEAR 16-20 | 172e,172 YEAR 21-25 |
| STORAGE BATTERY BLOCK 11a | OPERATED | OPERATED | OPERATED | OPERATED | RESTED |
| STORAGE BATTERY BLOCK 11b | OPERATED | OPERATED | OPERATED | RESTED | OPERATED |
| STORAGE BATTERY BLOCK 11c | OPERATED | OPERATED | RESTED | OPERATED | OPERATED |
| STORAGE BATTERY BLOCK 11d | OPERATED | RESTED | OPERATED | OPERATED | OPERATED |
| STORAGE BATTERY BLOCK 11e | RESTED | OPERATED | OPERATED | OPERATED | OPERATED |

(51) Int. Cl.
*H01M 10/42* (2006.01)
*H01M 10/60* (2014.01)
*H02J 7/00* (2006.01)

(56) References Cited

U.S. PATENT DOCUMENTS

| | | | | |
|---|---|---|---|---|
| 2004/0066170 | A1 | 4/2004 | Wen-Fei | |
| 2005/0077866 | A1* | 4/2005 | Killian | H02J 9/061 |
| | | | | 320/103 |
| 2008/0252258 | A1* | 10/2008 | Chang | H01M 10/44 |
| | | | | 320/133 |
| 2010/0085009 | A1* | 4/2010 | Kang | H02J 7/0019 |
| | | | | 324/427 |
| 2010/0185405 | A1* | 7/2010 | Aoshima | B60L 58/22 |
| | | | | 702/63 |
| 2011/0200852 | A1 | 8/2011 | Fukuhara | |
| 2012/0310571 | A1* | 12/2012 | Takagi | G01R 31/392 |
| | | | | 702/65 |
| 2015/0311736 | A1 | 10/2015 | Park et al. | |
| 2015/0377976 | A1* | 12/2015 | Maluf | G01R 31/392 |
| | | | | 702/63 |
| 2016/0105044 | A1* | 4/2016 | Yamaguchi | H02J 7/0013 |
| | | | | 320/112 |
| 2017/0163046 | A1* | 6/2017 | Patil | H02J 7/04 |
| 2017/0187202 | A1 | 6/2017 | Shin et al. | |
| 2017/0214256 | A1* | 7/2017 | Hardy | H02J 7/007182 |
| 2018/0145531 | A1* | 5/2018 | Jung | H02J 7/0071 |
| 2018/0241097 | A1 | 8/2018 | Yamasaki et al. | |
| 2019/0020209 | A1* | 1/2019 | Komiyama | H02J 7/0013 |
| 2019/0317155 | A1* | 10/2019 | Inoue | H02S 40/32 |
| 2020/0049774 | A1* | 2/2020 | Gao | G01R 31/392 |
| 2021/0318388 | A1* | 10/2021 | Bae | G01R 31/392 |
| 2021/0341982 | A1* | 11/2021 | He | H01M 10/443 |

FOREIGN PATENT DOCUMENTS

| | | |
|---|---|---|
| JP | 3093649 U | 5/2003 |
| JP | 2007-259612 A | 10/2007 |
| JP | 2017-120685 A | 7/2017 |
| JP | 2017-127169 A | 7/2017 |
| WO | 2010/038664 A1 | 4/2010 |

OTHER PUBLICATIONS

Extended European Search Report (Application No. 20926322.7) dated May 23, 2024 (5 pages).

International Search Report and Written Opinion (Application No. PCT/JP2020/038265) dated Dec. 28, 2020 (with English translation).

* cited by examiner

FIG. 4

| | YEAR 1-5 | YEAR 6-10 | YEAR 11-15 | YEAR 16-20 | YEAR 21-25 |
|---|---|---|---|---|---|
| STORAGE BATTERY BLOCK 11a | OPERATED | OPERATED | OPERATED | OPERATED | RESTED |
| STORAGE BATTERY BLOCK 11b | OPERATED | OPERATED | OPERATED | RESTED | OPERATED |
| STORAGE BATTERY BLOCK 11c | OPERATED | RESTED | RESTED | OPERATED | OPERATED |
| STORAGE BATTERY BLOCK 11d | OPERATED | OPERATED | OPERATED | OPERATED | OPERATED |
| STORAGE BATTERY BLOCK 11e | RESTED | OPERATED | OPERATED | OPERATED | OPERATED |

METHOD FOR OPERATING STORAGE BATTERY SYSTEM

BACKGROUND OF THE INVENTION

Field of the Invention

The present invention relates to a method for operating a storage battery system.

Description of the Background Art

Conventionally, storage batteries had been required to each have a performance warranty of approximately two years. With improvement in performance of the storage batteries, however, the storage battery system has recently been required to be used over a project life having a long period of 25 years to 30 years.

In a case where useful lives of the storage batteries are shorter than the project life of the storage battery system, a use of storage batteries over the project life is enabled by replacing all the storage batteries before the end of those useful lives.

On the other hand, extension of the useful lives of the storage batteries has also been contemplated.

In technology disclosed in Japanese Utility Model Registration No. 3093649, for example, a cycle battery output is performed. Stored electric energy of a previous set of batteries is used up before switching to a next set of batteries. A function to secure used lives of batteries can thereby be achieved.

In technology disclosed in Japanese Patent Application Laid-Open No. 2017-120685, a battery pack having a temperature higher than an average temperature of battery packs during charge or discharge is detected as a rest target battery pack. The rest target battery pack is electrically separated from a load and a power source, and then control is performed so that the temperature of the rest target battery pack is within a predetermined temperature range. A life of the battery pack can thereby be prolonged.

In technology disclosed in Japanese Patent Application Laid-Open No. 2017-127169, a particular group of assembled batteries is selected from n groups of assembled batteries in rotation, and is discharged to reach 100% in DOD once every n cycles. This leads to long lives of storage batteries.

In a case where the useful lives of the storage batteries are significantly shorter than the project life of the storage battery system, it is only necessary to replace all the storage batteries every time the end of the useful lives of the storage batteries arrives, and even when doing so, removal of storage batteries having long remaining lives can be avoided. For example, in a case where the project life is 20 years, and the useful lives of the storage batteries are five years, it is only necessary to replace all the storage batteries every five years, and even when doing so, removal of storage batteries having remaining lives can be avoided.

On the other hand, also in a case where the useful lives of the storage batteries are shorter than the project life of the storage battery system, but are close to the project life, it is necessary to replace all the storage batteries before the end of those useful lives, but in this case, storage batteries having long remaining lives are forced to be removed. For example, in a case where the project life is 25 years, and the useful lives of the storage batteries are 20 years, it is necessary to replace all the storage batteries every 12.5 years, so that storage batteries having remaining lives of 7.5 years are forced to be removed.

However, there is no choice but to dispose of the removed storage batteries having long remaining lives unless an environment to recycle the removed storage batteries as used storage batteries is created. Disposal of the storage batteries having long remaining lives is waste of resources, and adversely affects the environment. In terms of economics, disposal of the storage batteries having long remaining lives causes an increase in cost, and causes an increase in disposal cost. Disposal of the storage batteries having long remaining lives thus makes establishment of a project difficult.

SUMMARY

The present invention relates to a method for operating a storage battery system.

In a method for operating a storage battery system, a storage battery system including a plurality of storage batteries is prepared. The plurality of storage batteries are divided into a plurality of storage battery blocks. A useful life of each of the plurality of storage batteries is shorter than a project life. Total capacity of the plurality of storage batteries is equal to or greater than the product of capacity required for a project and a ratio of the project life to the useful life. The project life is divided into a plurality of periods. For each of the plurality of periods, a rest storage battery block is selected from the plurality of storage battery blocks in rotation, the rest storage battery block is rested, and an operational storage battery block of the plurality of storage battery blocks other than the rest storage battery block is operated. The sum of actual operating time, which indicates time each of the plurality of storage battery blocks has been operated, and equivalent operating time, which indicates time needed to cause, through the real operation of each of the plurality of storage battery blocks, the equivalent degradation to degradation caused to each of the plurality of storage battery blocks during the resting, is prevented from exceeding the useful life during the project life.

According to the present invention, the storage battery system can be used over the project life of the storage battery system, even in the case that the storage batteries has shorter useful lives than the project life. Furthermore, removal of the storage batteries having long remaining lives from the storage battery system can be suppressed.

It is therefore an object of the present invention to be able to use a storage battery system over a project life of the storage battery system even in the case that storage batteries has shorter useful lives than the project life, and to suppress removal of storage batteries having long remaining lives.

The objects, features, aspects, and advantages of the present invention will become more apparent from the following detailed description and the accompanying drawings.

BRIEF DESCRIPTION OF DRAWINGS

FIG. 4 is a diagram for describing a method for operating the storage battery system.

DESCRIPTION OF THE PREFERRED EMBODIMENTS

1 Storage Battery System

Figure 1:
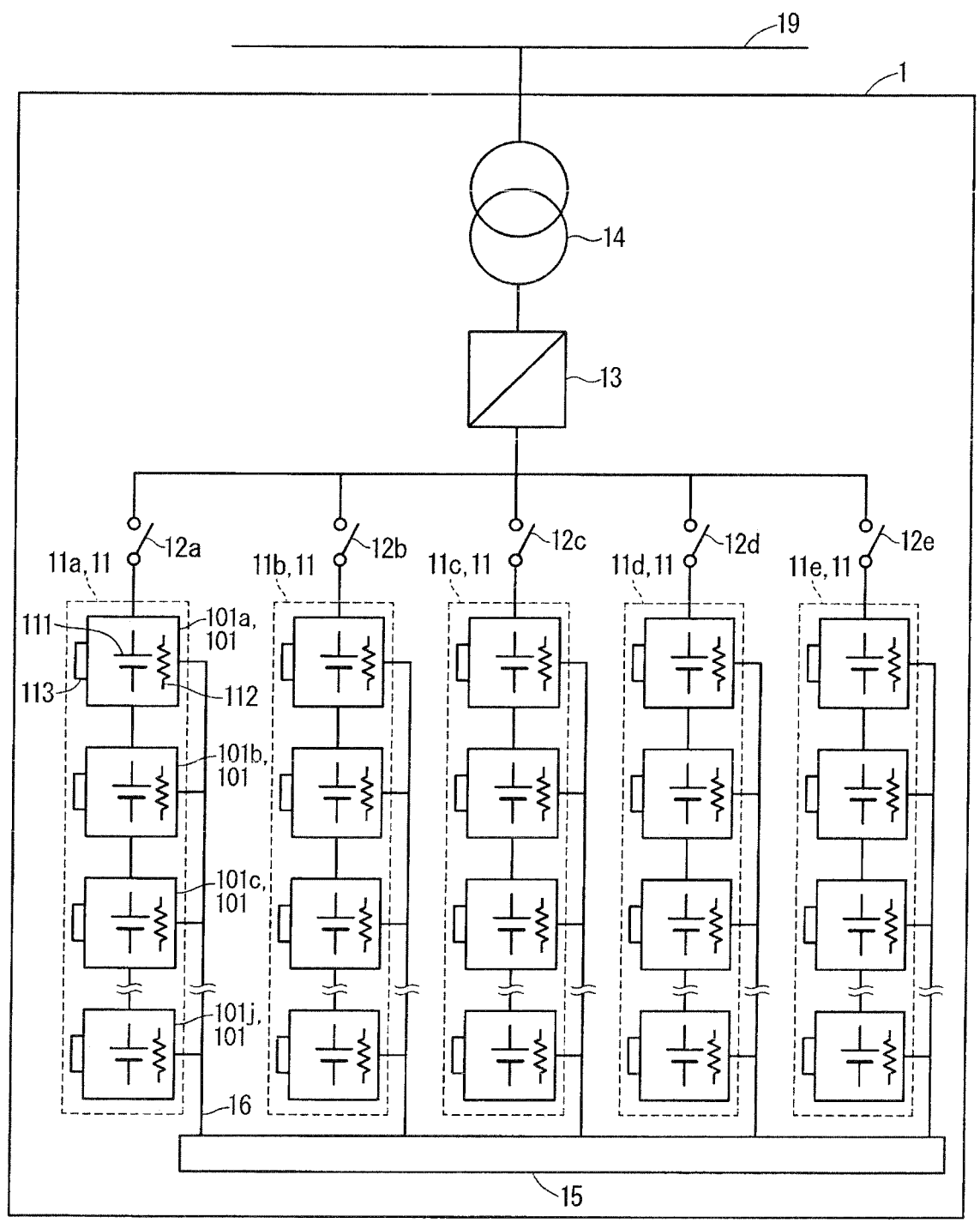
FIG. 1 is a block diagram schematically showing a storage battery system.
Figure 2:
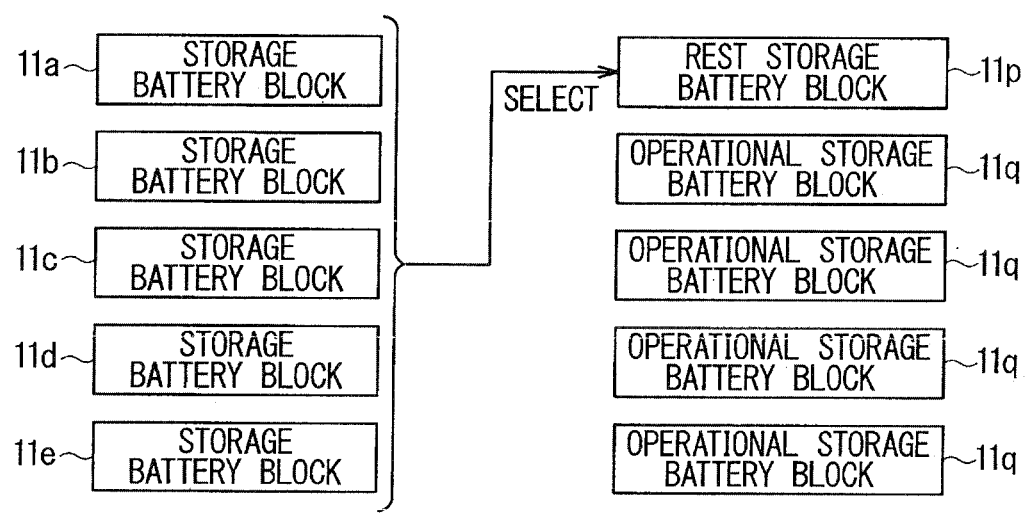
FIG. 2 is a diagram for describing a rest storage battery block and operational storage battery blocks of the storage battery system.

FIG. 1 is a block diagram schematically showing a storage battery system. FIG. 2 is a diagram for describing a rest storage battery block and operational storage battery blocks of the storage battery system.

A storage battery system 1 shown in FIG. 1 includes five storage battery blocks 11a, 11b, 11c, 11d, and 11e, five switches 12a, 12b, 12c, 12d, and 12e, a bi-directional converter (PCS) 13, and a transformer 14. The five storage battery blocks 11a, 11b, 11c, 11d, and 11e may be replaced with four or less or six or more storage battery blocks. The five switches 12a, 12b, 12c, 12d, and 12e may be replaced with four or less or six or more switches.

The five storage battery blocks 11a, 11b, 11c, 11d, and 11e (hereinafter also simply referred to as storage battery blocks 11) each include 10 storage batteries 101a, 101b, 101c, . . . , and 101j as shown in FIG. 1. The storage battery system 1 thus includes 50 storage batteries 101a, 101b, 101c, . . . , and 101j. The 10 storage batteries 101a, 101b, 101c, . . . , and 101j of each of the storage battery blocks 11 may be replaced with nine or less or 11 or more storage batteries. The 50 storage batteries 101a, 101b, 101c, . . . , and 101j of the storage battery system 1 may thus be replaced with 49 or less or 51 or more storage batteries.

The storage batteries 101a, 101b, 101c, . . . , and 101j (hereinafter also simply referred to as storage batteries 101) are also referred to as module batteries. The storage batteries 101 each include an assembled battery 111 as shown in FIG. 1.

The storage battery blocks 11a, 11b, 11c, 11d, and 11e respectively correspond to the switches 12a, 12b, 12c, 12d, and 12e. The storage battery blocks 11a, 11b, 11c, 11d, and 11e are electrically connected, via the respective switches 12a, 12b, 12c, 12d, and 12e, to a DC side of the PCS 13. An AC side of the PCS 13 is electrically connected to a system 19 via the transformer 14.

As shown in FIG. 2, the storage battery blocks 11a, 11b, 11c, 11d, and 11e include a rest storage battery block 11p and operational storage battery blocks 11q.

The rest storage battery block 11p is selected from the storage battery blocks 11a, 11b, 11c, 11d, and 11e. The operational storage battery blocks 11q are storage battery blocks of the storage battery blocks 11a, 11b, 11c, 11d, and 11e other than the rest storage battery block 11p.

A switch corresponding to the rest storage battery block 11p is opened. Switches corresponding to the operational storage battery blocks 11q are closed.

When the storage battery system 1 outputs AC power to the system 19, the operational storage battery blocks 11q output DC power. The PCS 13 converts a DC voltage as output into an AC voltage. The transformer 14 steps up the AC power, and outputs the AC voltage as stepped up to the system 19. The rest storage battery block 11p, however, does not output the DC power. When the AC power is input into the storage battery system 1 from the system 19, the AC power is input into the transformer 14. The transformer 14 steps down the AC power as input. The PCS 13 converts the AC power as stepped down into the DC power. The DC power is input into the operational storage battery blocks 11q. The DC power, however, is not input into the rest storage battery block 11p.

When the operational storage battery blocks 11q output the DC power, the storage batteries 101a, 101b, 101c, . . . , and 101j of the operational storage battery blocks 11q discharge the DC power. When the DC power is input into the operational storage battery blocks 11q, the storage batteries 101a, 101b, 101c, . . . , and 101j of the operational storage battery blocks 11q are charged with the DC power.

When each of the storage batteries 101 is discharged, the assembled battery 111 of the storage battery 101 is discharged. When each of the storage batteries 101 is charged, the assembled battery 111 of the storage battery 101 is charged.

The storage batteries 101 each include a heating mechanism 112 and a cooling mechanism 113 as shown in FIG. 1.

The heating mechanism 112 of each of the storage batteries 101 heats cells 163, which will be described below, of the storage battery 101. The heating mechanism 112 is exemplified by an electrothermal heater and a heat pump. The cooling mechanism 113 of each of the storage batteries 101 cools the cells 163, which will be described below, of the storage battery 101. The cooling mechanism 113 is exemplified by a cooling fan and a heat pump.

The storage battery system 1 includes a measurement system 15 and an electrical connection 16 as shown in FIG. 1.

The measurement system 15 measures a voltage of each of the storage batteries 101, a current flowing through each of the storage batteries 101, and the like. The electrical connection 16 electrically connects each of the storage batteries 101 and the measurement system 15. The electrical connection 16 directly connects a measurement sensor mounted to each of the storage batteries 101 and the measurement system 15 or transmits a signal indicating a result of measurement performed by the measurement sensor from each of the storage batteries 101 to the measurement system 15.

2 Assembled Battery

Figure 3:
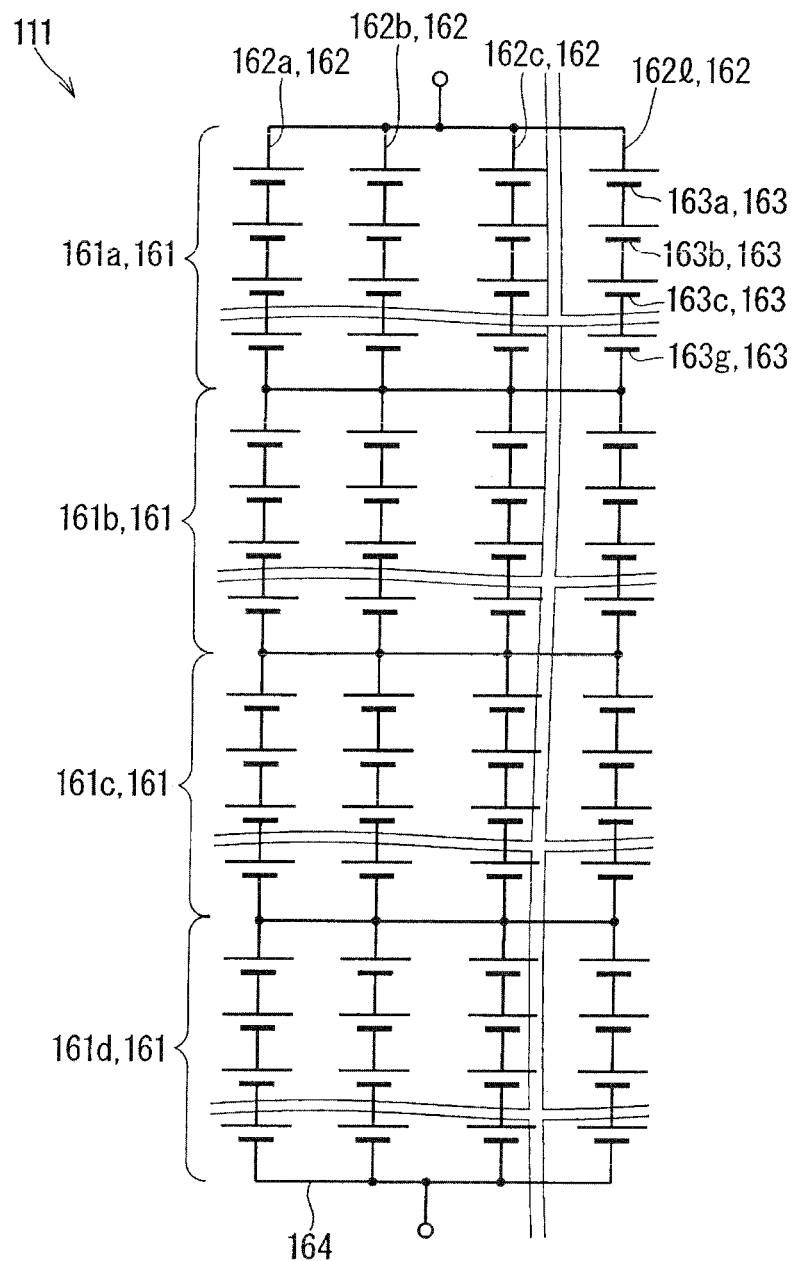
FIG. 3 is a circuit diagram schematically showing an assembled battery of the storage battery system.

FIG. 3 is a circuit diagram schematically showing the assembled battery of the storage battery system in the first embodiment.

The assembled battery 111 includes four cell blocks 161a, 161b, 161c, and 161d as shown in FIG. 3. The four cell blocks 161a, 161b, 161c, and 161d may be replaced with three or less or five or more cell blocks.

A cell block 161 as each of the cell blocks 161a, 161b, 161c, and 161d includes 12 cell strings 162a, 162b, 162c, . . . , and 162l as shown in FIG. 3. The 12 cell strings 162a, 162b, 162c, . . . , and 162l may be replaced with 11 or less or 13 or more cell strings.

A cell string 162 as each of the cell strings 162a, 162b, 162c, . . . , and 162l includes eight cells 163a, 163b, 163c, . . . , and 163g. The eight cells 163a, 163b, 163c, and 163g may be replaced with seven or less or nine or more cells.

The cell blocks 161a, 161b, 161c, and 161d are electrically connected in series. In the cell block 161, the cell strings 162a, 162b, 162c, . . . , and 162l are electrically connected in parallel. In the cell string 162, the cells 163a, 163b, 163c, . . . , and 163g are electrically connected in series.

The storage battery 101 thus includes 384 cells 163a, 163b, 163c, . . . , and 163g and an electrical connection 164.

The electrical connection 164 electrically connects the 384 cells.

The cells 163a, 163b, 163c, . . . , and 163g (hereinafter also simply referred to as the cells 163) are each a high temperature operating secondary battery. The high temperature operating secondary battery is a secondary battery required to have a temperature higher than a room temperature to be charged or discharged. For example, the high temperature operating secondary battery is a secondary battery operating in a temperature range of 200° C. or more and 360° C. or less. The high temperature operating secondary battery is exemplified by a sodium-sulfur battery and the ZEBRA battery. The ZEBRA battery is exemplified by a sodium-nickel-chloride battery. The cells 163 may each be a secondary battery other than the high temperature operating secondary battery. For example, the cells 163 may each be a lithium-ion battery, a nickel metal hydride battery, a nickel-cadmium battery, a lead-acid battery, or the like.

3 Relationship Between Useful Lives of Storage Batteries and Project Life of Storage Battery System and Relationship Between Capacity of Storage Batteries and Capacity Required for Project A project life of the storage battery system 1 indicates the length of a project. The project life of the storage battery system 1 is the length of a period during which the storage battery system 1 can be used while maintaining performance meeting a specification of the storage battery system 1. The project life of the storage battery system 1 is also the length of a service contract period during which maintenance of performance meeting the specification of the storage battery system 1 is warranted. Maintenance of performance meeting the specification of the storage battery system 1 is warranted over an entire operational period of the storage battery system 1 in the project. The project life of the storage battery system 1 is typically disclosed to a customer of the storage battery system 1.

Capacity required for the project is input/output capacity required for the storage battery system 1 in a case where the storage battery system 1 is operated based on an operational condition of the storage battery system 1 in the project. The input/output capacity is represented by electric energy (Wh) and the like. The input/output capacity may vary from year to year of the operational period of the storage battery system 1 in the project in view of degradation of the storage battery system 1. In this case, the capacity of the storage battery system 1 when the project life has ended is used as the capacity required for the project. The capacity required for the project is typically disclosed to the customer of the storage battery system 1.

The useful life of each of the storage batteries 101 is the length of a period until the capacity of each of the storage batteries 101 is reduced to capacity to be determined to be at the end of life, which has been set in the project, or to capacity to be determined to be at the end of life of each of the storage batteries 101 based on deterioration characteristics of each of the storage batteries 101, in a case where charge and discharge cycle operation of the storage battery system 1 is continued based on the operational condition of the storage battery system 1. The capacity to be determined to be at the end of life is typically 80% of initial capacity.

The project life of the storage battery system 1 is 10 years or more. The useful life of each of the storage batteries 101 is five years or more. The useful life of each of the storage batteries 101 is shorter than the project life of the storage battery system 1. For example, the useful life of each of the storage batteries 101 is 20 years, and the project life of the storage battery system 1 is 25 years.

Total capacity of the 50 storage batteries 101 of the storage battery system 1 is equal to or greater than the product of the capacity required for the project and a ratio of the project life of the storage battery system 1 to the useful life of each of the storage batteries 101. The total capacity of the 50 storage batteries 101 is only required to be equal to or greater than the product before the end of the useful lives of the 50 storage batteries 101 arrives.

The 50 storage batteries 101 of the storage battery system 1 are divided into the five storage battery blocks 11a, 11b, 11c, 11d, and 11e. In a case where one rest storage battery block 11p of the five storage battery blocks 11a, 11b, 11c, 11d, and 11e is rested, and four operational storage battery blocks 11q other than the one rest storage battery block 11p are operated in the storage battery system 1, total capacity of 40 storage batteries 101 belonging to the four operational storage battery blocks 11q is equal to or greater than the capacity required for the project. The capacity required for the project can thus be provided by operating the four operational storage battery blocks 11q even in a case where the one rest storage battery block 11p is rested.

4 Method for Operating Storage Battery System

FIG. 4 is a diagram for describing a method for operating the storage battery system in the first embodiment.

When the storage battery system 1 is operated, the storage battery system 1 is prepared.

When the storage battery system 1 is operated, a project life 171 of the storage battery system 1 is divided into a plurality of periods 172a, 172b, 172c, 172d, and 172e as shown in FIG. 4.

The plurality of periods 172a, 172b, 172c, 172d, and 172e (hereinafter also simply referred to as periods 172) each have the length of one year or more.

When the storage battery system 1 is operated, the rest storage battery block 11p is selected, for each of the periods 172, from the storage battery blocks 11a, 11b, 11c, 11d, and 11e in rotation. The rest storage battery block 11p is rested during each of the periods 172. The operational storage battery blocks 11q are operated during each of the periods 172. For example, the storage battery block 11e is rested as the rest storage battery block 11p during the first period 172a. The storage battery blocks 11a, 11b, 11e, and 11d are operated as the operational storage battery blocks 11q during the first period 172a. The storage battery block 11d is rested as the rest storage battery block 11p during the second period 172b. The storage battery blocks 11a, 11b, 11c, and 11e are operated as the operational storage battery blocks 11q during the second period 172b. The storage battery block 11c is rested as the rest storage battery block 11p during the third period 172c. The storage battery blocks 11a, 11b, 11d, and 11e are operated as the operational storage battery blocks 11q during the third period 172c. The storage battery block 11b is rested as the rest storage battery block 11p during the fourth period 172d. The storage battery blocks 11a, 11c, 11d, and 11e are operated as the operational storage battery blocks 11q during the fourth period 172d. The storage battery block 11a is rested as the rest storage battery block 11p during the fifth period 172e. The storage battery blocks 11b, 11c, 11d, and 11e are operated as the operational storage battery blocks 11q during the fifth period 172e. The rest storage battery block 11p is thus selected from the storage battery blocks 11a, 11b, 11c, 11d, and 11e in rotation, and is rested. The rest storage battery block 11p rested during each of the periods 172 may include two or more storage battery blocks.

Furthermore, when the storage battery system 1 is operated, the sum of actual operating time, which indicates time each of the storage battery blocks 11 has been operated, and equivalent operating time, which indicates time needed to cause, through the real operation of each of the storage battery blocks 11, the equivalent degradation to degradation caused to each of the storage battery blocks 11 during the resting, is prevented from exceeding the useful life of each of the storage batteries 101 during the project life 171 of the storage battery system 1. The equivalent operating period is considered to be 10/50 times a rest period when the length of a period until the capacity of each of the storage battery blocks 11 is reduced to 80% of the initial capacity is assumed to be 10 years in a case where cycle operation to discharge rated capacity is continued within a range of an environmental condition and a state of charge (SOC) assumed in the project and the length of a period until the capacity of each of the storage battery blocks 11 is reduced to 80% of the initial capacity is assumed to be 50 years under a particular environmental condition set in the rest period.

The one storage battery block 11e is added to the four storage battery blocks 11a, 11b, 11c, and 11d that are the minimum necessary to provide the capacity required for the project, and one of the five storage battery blocks 11a, 11b, 11c, 11d, and 11e is rested in rotation, so that the storage batteries 101 each having the useful life shorter than the project life 171 of the storage battery system 1 can be used over the project life 171 of the storage battery system 1. Furthermore, removal of the storage batteries having long remaining lives from the storage battery system 1 can be suppressed. The storage batteries 101 can thus be used generally until the end of the useful lives of the storage batteries 101. The effect is particularly significant in a case where the useful life of each of the storage batteries 101 is close to the project life 171 of the storage battery system 1, and the project life 171 of the storage battery system 1 is shorter than twice the useful life of each of the storage batteries 101.

4.1 Rest and Operation of Storage Battery Blocks

The storage batteries 101 of the rest storage battery block 11p (hereinafter, rest block storage batteries) are not charged and discharged even in a case where the AC power is input into the storage battery system 1 from the system 19 and in a case where the AC power is output from the storage battery system 1 to the system 19. The storage batteries 101 of each of the operational storage battery blocks 11q (hereinafter, operational block storage batteries) are charged and discharged in a case where the AC power is input into the storage battery system 1 from the system 19 and in a case where the AC power is output from the storage battery system 1 to the system 19.

In a case where the cells 163 are high temperature operating secondary batteries, the cells 163a, 163b, 163c, . . . , and 163g of each of the rest block storage batteries (hereinafter, rest block cells) are brought to the room temperature during each of the periods 172. Meanwhile, the cells 163a, 163b, 163c, . . . , and 163g of each of the operational block storage batteries (hereinafter, operational block cells) are brought to a temperature higher than the room temperature during each of the periods 172. The temperature higher than the room temperature is approximately 300° C. Since the heating mechanism 112 for heating the operational block cells is not stopped and supply of the heat retaining power to the heating mechanism 112 is not interrupted, the operational block cells are heated by the heating mechanism 112. On the other hand, supply of heat retaining power to the heating mechanism 112 for heating the rest block cells is interrupted, thereby to stop the heating mechanism 112, and thus, the rest block cells are not heated by the heating mechanism 112. Degradation of members constituting the rest block cells caused by bringing the rest block cells to the temperature higher than the room temperature can thereby be suppressed. In a case where the rest block cells are brought to the room temperature, the rest storage battery block 11p is hardly degraded, and the equivalent operating time of the rest storage battery block 11p can be considered to be almost zero.

The state of charge of the rest block storage batteries is caused to fall within a set range at the start of each of the periods 172. Supplemental charge to supplement natural discharge of the rest block storage batteries is performed to maintain the state of charge of the rest block storage batteries within the set range during each of the periods 172. The set range is a range within which degradation of the storage batteries 101 can be suppressed. Degradation of the rest block storage batteries can thereby be suppressed. In a case where the cells 163 are lithium-ion batteries, degradation of the storage batteries 101 is likely to progress when the storage batteries 101 are at the end of charge, and thus the set range is preferably 80% or less. In a case where the cells 163 are lithium-ion batteries, the state of charge of the storage batteries 101 is reduced by approximately 5% per month due to self-discharge, so that periodic supplemental charge to supplement the self-discharge of the rest block storage batteries is performed approximately once a year when the rest block is rested over a long period. In a case where the cells 163 are nickel-cadmium batteries or nickel metal hydride batteries, the state of charge of the storage batteries 101 has little influence on the progress of degradation of the storage batteries 101. The state of charge of the storage batteries 101, however, is reduced by approximately 25% per month due to self-discharge. Supplemental charge to supplement the self-discharge of the rest block storage batteries is thus performed approximately a few times a year to suppress over-discharge of the storage batteries 101.

The rest block cells are heated by the heating mechanism 112 or cooled by the cooling mechanism 113 during each of the periods 172 to cause the temperature of the rest block cells 163a, 163b, 163c, . . . , and 163g to fall within a set range. The set range is a range within which degradation of the storage batteries 101a, 101b, 101c, . . . , and 101j can be suppressed. In a case where the cells 163 are lead batteries or lithium-ion batteries, degradation of the storage batteries 101a, 101b, 101c, . . . , and 101j progresses as the temperature of the cells 163a, 163b, 163c, . . . , and 163g of each of the storage batteries 101a, 101b, 101c, . . . , and 101j increases, and thus the set range is preferably 20° C. or less. In a case where the cells 163 are high temperature operating secondary batteries, such as sodium-sulfur batteries, the set range is preferably the room temperature.

The electrical connection 164 electrically connecting the rest block cells is opened during each of the periods 172. Degradation of the cells 163a, 163b, 163c, . . . , and 163g caused by a prolonged flow of a circulating current between circuits electrically connected in parallel, which is caused by a potential difference between the cells 163a, 163b, 163c, . . . , and 163g due to self-discharge of each of the cells 163, can thereby be suppressed.

The electrical connection 16 electrically connecting each of the rest block storage batteries and the measurement system 15 is opened during each of the periods 172. The continuation of micro-discharge of the storage batteries 101 due to a leakage current flowing from the rest block storage batteries to the measurement system 15 can thereby be suppressed.

The rest storage battery block 11e rested during the first period 172a of the plurality of periods 172a, 172b, 172c, 172d, and 172e is installed in the storage battery system 1 after the start of the first period 172a. The rest storage battery block 11e is only required to be installed in the storage battery system 1 before the start of the period 172b during which the rest storage battery block 11e is operated. An initial cost of the storage battery system 1 can thereby be suppressed.

When the rest storage battery block 11p is selected, a storage battery block having longer operating time is preferentially selected as the rest storage battery block 11p. In a case where the storage battery blocks have substantially the same operating time, a storage battery block including more storage batteries each having a degree of degradation higher than a degree of degradation set for storage batteries is preferentially selected as the rest storage battery block 11p. When the degree of degradation of each of the storage batteries is identified, the number of failing cells of each of the storage batteries is also taken into consideration.

A storage battery required to be repaired of the rest storage battery block 11p is repaired during each of the periods 172. The storage battery required to be repaired is a storage battery determined to be preferably repaired to maintain or improve performance in future operation. The storage battery required to be repaired may be repaired in a state of being installed in the storage battery system 1, or may be moved from the storage battery system 1 to a repair factory to be repaired in the repair factory, and then moved from the repair factory to the storage battery system 1. When a certain storage battery is repaired, a cell of the storage battery is replaced with a new cell, for example. The storage battery required to be repaired is moved from the storage battery system 1 to the repair factory to be repaired in the repair factory, and then moved from the repair factory to the storage battery system 1, so that high operating efficiency is enabled in each of the storage battery system 1 and the repair factory.

At the start of each of the periods 172, a first storage battery of each of the operational storage battery blocks 11q may be replaced with a second storage battery of the rest storage battery block 11p having a lower degree of degradation than the first storage battery. The first storage battery is a storage battery having a high degree of degradation. When the degree of degradation of each of the storage batteries is identified, the number of failing cells of each of the storage batteries is also taken into consideration.

An unsound storage battery of each of the operational storage battery blocks 11q is replaced with a sound storage battery of the rest storage battery block 11p. The unsound storage battery is a storage battery interfering with maintenance of performance of the storage battery system 1 or having signs of interference with maintenance of performance of the storage battery system 1. Performance of the storage battery system 1 can thereby be maintained and/or improved. Replacement may be temporary or permanent.

While the invention has been described in detail, the foregoing description is in all aspects illustrative and not restrictive. It is therefore understood that numerous unillustrated modifications can be devised without departing from the scope of the invention.

What is claimed is:

1. A method for operating a storage battery system comprising:
   preparing a storage battery system including a plurality of storage batteries divided into a plurality of storage battery blocks, a useful life of each of the plurality of storage batteries being shorter than a project life, and total capacity of the plurality of storage batteries is equal to or greater than a product of capacity required for a project and a ratio of the project life to the useful life;
   dividing the project life into a plurality of periods;
   selecting, for each of the plurality of periods, a rest storage battery block from the plurality of storage battery blocks in rotation, resting the rest storage battery block, and operating an operational storage battery block of the plurality of storage battery blocks other than the rest storage battery block;
   preventing a sum of actual operating time and equivalent operating time from exceeding the useful life during the project life, the actual operating time indicating time each of the plurality of storage battery blocks has been operated, and the equivalent operating time indicating time needed to cause, through the real operation of each of the plurality of storage battery blocks, the equivalent degradation to degradation caused to each of the plurality of storage battery blocks during the resting;
   causing a state of charge of one or more storage batteries of the rest storage battery block to achieve a set range at a start of each of the plurality of periods; and
   performing supplemental charge to supplement self-discharge of the storage batteries of the rest storage battery block during each of the plurality of periods to maintain the state of charge of the storage batteries of the rest storage battery block within the set range.

2. The method for operating the storage battery system according to claim 1, wherein
   the project life is shorter than twice the useful life.

3. The method for operating the storage battery system according to claim 1, wherein
   the plurality of storage batteries each include a cell, and
   the method for operating the storage battery system farther comprises
      heating or cooling the cell of each of one or more storage batteries of the rest storage battery block during each of the plurality of periods to cause a temperature of the cell to achieve a set range.

4. The method for operating the storage battery system according to claim 3, wherein
   the storage battery system includes a measurement system and an electrical connection electrically connecting each of the plurality of storage batteries and the measurement system, and
   the method for operating the storage battery system further comprises
      opening the electrical connection electrically connecting each of one or more storage batteries of the rest storage battery block and the measurement system during each of the plurality of periods.

5. The method for operating the storage battery system according to claim 3, wherein
   at a start of each of the periods, a first storage battery of the operational storage battery block is replaced with a second storage battery of the rest storage battery block having a lower degree of degradation than the first storage battery.

6. The method for operating the storage battery system according to claim 1, wherein
   the plurality of storage batteries each include a plurality of cells and an electrical connection electrically connecting the plurality of cells, and
   the method for operating the storage battery system further comprises
      opening the electrical connection electrically connecting the plurality of cells of each of one or more storage batteries of the rest storage battery block during each of the plurality of periods.

7. The method for operating the storage battery system according to claim 6, wherein
at a start of each of the periods, a first storage battery of the operational storage battery block is replaced with a second storage battery of the rest storage battery block having a lower degree of degradation than the first storage battery.

8. The method for operating the storage battery system according to claim 1, wherein
the storage battery system includes a measurement system and an electrical connection electrically connecting each of the plurality of storage batteries and the measurement system, and
the method for operating the storage battery system further comprises
opening the electrical connection electrically connecting each of one or more storage batteries of the rest storage battery block and the measurement system during each of the plurality of periods.

9. The method for operating the storage battery system according to claim 1, wherein
the rest storage battery block rested during a first period of the plurality of periods is installed in the storage battery system after a start of the first period.

10. The method for operating the storage battery system according to claim 1, further comprising
selecting a storage battery block including more storage batteries each having a degree of degradation higher than a set degree of degradation preferentially as the rest storage battery block.

11. The method for operating the storage battery system according to claim 1, wherein
a storage battery required to be repaired of the rest storage battery block is repaired during each of the plurality of periods.

12. The method for operating the storage battery system according to claim 1, wherein
at a start of each of the periods, a first storage battery of the operational storage battery block is replaced with a second storage battery of the rest storage battery block having a lower degree of degradation than the first storage battery.

13. The method for operating the storage battery system according to claim 1, wherein
an unsound storage battery of the operational storage battery block is replaced with a sound storage battery of the rest storage battery block.

14. The method for operating the storage battery system according to claim 1, wherein
the plurality of storage batteries each include a cell,
the cell is a high temperature operating secondary battery, and
the cell of each of one or more storage batteries of the rest storage battery block is brought to a room temperature, and the cell of each of one or more storage batteries of the operational storage battery block is brought to a temperature higher than the room temperature during each of the plurality of periods.

15. The method for operating the storage battery system according to claim 1, wherein
the project life is 10 years or more,
the useful life is five years or more, and
each of the plurality of periods has a length of one year or more.

* * * * *